(12) United States Patent
Zhang et al.

(10) Patent No.: US 11,269,474 B2
(45) Date of Patent: Mar. 8, 2022

(54) TOUCH DEVICES

(71) Applicant: Beijing Zenithnano Technology Co., Ltd., Beijing (CN)

(72) Inventors: Yuchun Zhang, Jiangsu Province (CN); Shudong Zhong, Beijing (CN); Mao Li, Beijing (CN)

(73) Assignee: Beijing Zenithnano Technology Co., Ltd, Beijing (CN)

( * ) Notice: Subject to any disclaimer, the term of this patent is extended or adjusted under 35 U.S.C. 154(b) by 0 days.

(21) Appl. No.: 17/230,689

(22) Filed: Apr. 14, 2021

(65) Prior Publication Data

US 2021/0333907 A1 Oct. 28, 2021

(30) Foreign Application Priority Data

Apr. 28, 2020 (CN) .......................... 202010348850.6

(51) Int. Cl.
*G06F 3/045* (2006.01)
*G06F 3/041* (2006.01)

(52) U.S. Cl.
CPC ............ *G06F 3/045* (2013.01); *G06F 3/0412* (2013.01)

(58) Field of Classification Search
None
See application file for complete search history.

(56) References Cited

U.S. PATENT DOCUMENTS

| 2010/0089623 | A1 | 4/2010 | Jang et al. | |
|---|---|---|---|---|
| 2014/0078104 | A1* | 3/2014 | Lee | G06F 3/0412 345/174 |
| 2014/0092324 | A1* | 4/2014 | Kim | G06F 3/0443 349/12 |

FOREIGN PATENT DOCUMENTS

| CN | 101187057 | 5/2008 |
|---|---|---|
| CN | 201266244 | 7/2009 |
| CN | 101697288 | 4/2010 |
| CN | 102346588 | 2/2012 |
| CN | 103176679 | 6/2013 |
| CN | 103632755 | 3/2014 |
| CN | 104375728 | 2/2015 |
| CN | 104461135 | 3/2015 |

(Continued)

OTHER PUBLICATIONS

Chinese International Search Report, CN2020103494704, dated Feb. 26, 2021, 6 pages. No English Translation.

(Continued)

*Primary Examiner* — Stephen T. Reed
(74) *Attorney, Agent, or Firm* — Adsero IP (57) ABSTRACT

The present disclosure discloses a touch device, including a display region and a transmission region. The transmission region is arranged on at least one side around the display region. The touch device includes a first flexible film, a first low-resistance conductive layer, a first adhesive layer, a second flexible film, a second low-resistance conductive layer, a second adhesive layer, and a transparent cover plate sequentially from bottom to top. The first low-resistance conductive layer includes a first touch conductive layer and a first wire integrally formed. The second low-resistance conductive layer includes a second touch conductive layer and a second wire integrally formed. The first touch conductive layer and the second touch conductive layer correspond to the display region. The first wire and the second wire correspond to the transmission region.

13 Claims, 4 Drawing Sheets

(56) References Cited

FOREIGN PATENT DOCUMENTS

| CN | 104915048 | 9/2015 |
|---|---|---|
| CN | 105039911 | 11/2015 |
| CN | 105224115 | 1/2016 |
| CN | 105867712 | 8/2016 |
| CN | 106484191 | 3/2017 |
| CN | 106756789 | 5/2017 |
| CN | 107254664 | 10/2017 |
| CN | 107783697 | 3/2018 |
| CN | 107881486 | 4/2018 |
| CN | 108074991 | 5/2018 |
| CN | 207458013 | 6/2018 |
| CN | 108766631 | 11/2018 |
| CN | 108878058 | 11/2018 |
| CN | 109686477 | 4/2019 |
| CN | 109782953 | 5/2019 |
| CN | 109871160 | 6/2019 |
| CN | 110058747 | 7/2019 |
| CN | 209071007 | 7/2019 |
| EP | 1691352 | 8/2006 |
| JP | 2015060728 | 3/2015 |
| JP | 2016004356 | 1/2016 |
| JP | 6350000 | 7/2018 |
| TW | M455209 | 6/2013 |
| WO | WO2016-190405 A1 | 12/2016 |
| WO | WO-2019-001068 A1 | 1/2019 |

OTHER PUBLICATIONS

Chinese International Search Report, CN2020103488972, dated Feb. 26, 2021, 5 pages. No English Translation.
Chinese International Search Report, CN2020103488506, dated Feb. 26, 2021, 6 pages. No English Translation.
Chinese International Search Report, CN2020103494545, dated Feb. 26, 2021, 6 pages. No English Translation.
Chinese International Search Report, CN2020103489119, dated Feb. 26, 2021, 5 pages. No English Translation.

* cited by examiner

TOUCH DEVICES

CROSS-REFERENCES TO RELATED APPLICATIONS

This application claims priority to Chinese Patent Application No. CN202010348850.6, entitled "TOUCH DEVICES", filed on Apr. 28, 2020, the entireties of which are incorporated herein by reference in their entirety for all purposes.

TECHNICAL FIELD

The present disclosure relates to touch devices.

BACKGROUND

In recent years, touch screens have the characteristics of human-computer interaction, and have been widely used in electronic products such as smartphones, GPS navigator systems, tablet PCs, personal digital assistants (PDAs), and laptop PCs. Touch panels are configured to be used on display screens of these appliances to allow users to perform interactive input operations, thereby improving the efficiency of the input operations. Unfortunately, conventional touch screens are inadequate.

SUMMARY

In order to solve the above problems, the present disclosure discloses a touch device, including a display region and a transmission region. The transmission region is arranged on at least one side around the display region. The touch screen includes a first flexible film, a first low-resistance conductive layer, a first adhesive layer, a second flexible film, a second low-resistance conductive layer, a second adhesive layer, and a transparent cover plate sequentially from bottom to top. The first low-resistance conductive layer includes a first touch conductive layer and a first wire integrally formed. The second low-resistance conductive layer includes a second touch conductive layer and a second wire integrally formed. The first touch conductive layer and the second touch conductive layer correspond to the display region. The first wire and the second wire correspond to the transmission region. A thickness of the first wire is greater than that of the first touch conductive layer, and a thickness of the second wire is greater than that of the second touch conductive layer.

Preferably, a resistance of the first low-resistance conductive layer and a resistance of the second low-resistance conductive layer are less than 30Ω/□.

Preferably, a thickness difference between the second wire and the second touch conductive layer is 18-22 nm.

Preferably, thicknesses of the first wire and the second wire are 95-145 nm.

Preferably, impedance of the first wire and impedance of the second wire are less than or equal to 5Ω.

Preferably, a horizontal projection distance of the first wire above a side face of the first touch conductive layer and a horizontal projection distance of the second wire above a side face of the second touch conductive layer are 0-5 nm.

Preferably, an angle between the side face and the second touch conductive layer is an acute angle.

Preferably, a refractive index of the first adhesive layer is 1.6-1.8, and a refractive index of the second adhesive layer is 1.8-2.0.

Preferably, the low-resistance conductive layer includes a weathering layer, an electrical conduction layer, an anti-oxidation layer, and a transparent conductive material layer.

Preferably, a thickness of the display region to which the electrical conduction layer belongs is less than or equal to 10 nm.

The technical solution of the present disclosure can be used to transmit signals as it adopts a low-resistance conductive layer with low impedance. The touch conductive layer of the display region and the wire of the transmission region are integrally formed, which saves the complexity of different manufacturing processes, and saves the cost. At the same time, in the low-resistance conductive layer supported by the flexible film, the touch conductive layer in the display region may not be easily detached from the wire in the transmission region, which also eliminates the need to reinforce a lap region between the touch conductive layer and the wire.

DETAILED DESCRIPTION OF THE EMBODIMENTS

At present, a common structure in touch devices is a GFF structure. G refers to a cover plate, which plays a protective role, and F refers to a film carrying a conductive layer. Two films respectively induce and drive a touch function together. However, ITO and other conductive materials are generally used to design a pattern for a display region of the carried conductive layer. Due to the large impedance of the ITO material, materials such as silver paste with small impedance need to be used for electric transmission in a transmission region, so as to enter a chip to calculate a touch position. The display region and the transmission region need to be made in steps in the manufacturing process. First, an ITO film is sputtered, conductive silver paste is printed, and then the display region and the transmission region are patterned respectively. The above manufacturing process is complicated and tedious, and the cost is high. Besides, the display region and the transmission region are made of different materials, which requires additional strengthening on lap joints. Otherwise, the display and transmission regions may be separated, affecting the touch function.

In order to make the objectives, technical solutions, and advantages of the present disclosure clearer, the present disclosure is further described in detail below in combination with embodiments. It is understood that the specific embodiments described herein are intended only to explain the present disclosure and are not to define the present disclosure.

Figure 1:
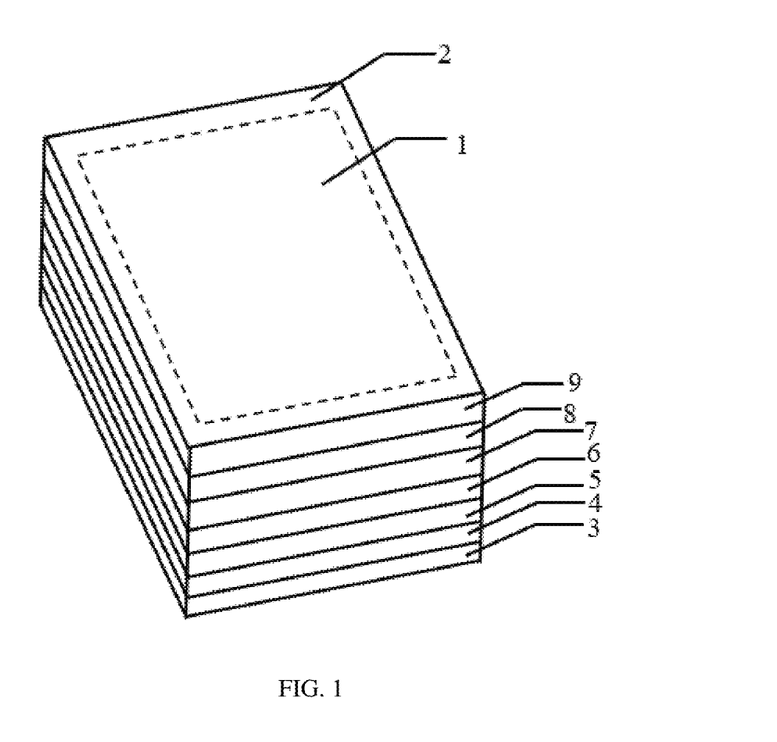
FIG. 1 is a schematic three-dimensional diagram of a touch device according to an embodiment of the present disclosure.
Figure 2:
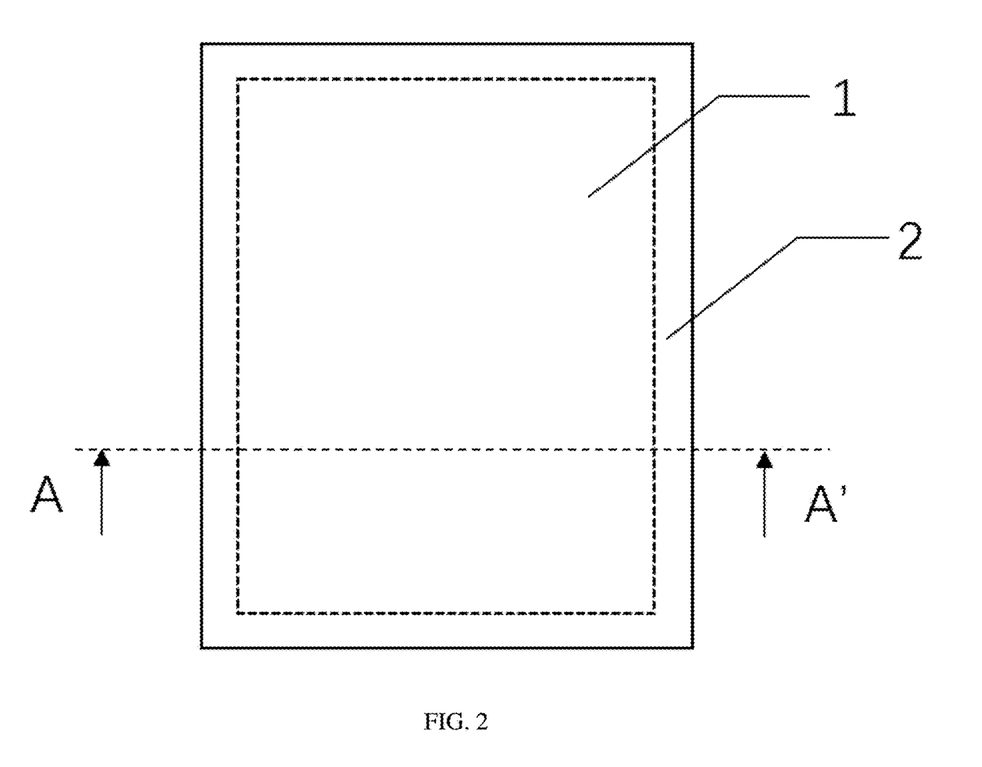
FIG. 2 is a top view of a touch device according to an embodiment of the present disclosure.
Figure 3:
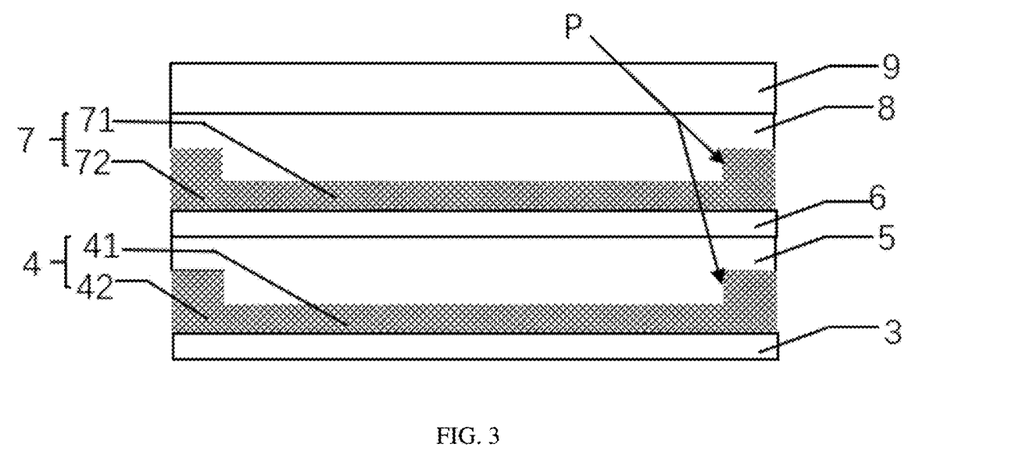
FIG. 3 is a schematic diagram of a profile in an A-A' direction in FIG. 2.

As shown in FIG. 1, FIG. 2, and FIG. 3, in an embodiment of the present disclosure, a touch device includes a display region 1 and a transmission region 2. The transmission region 2 is arranged on at least one side around the display region 1. The touch device includes a first flexible film 3, a first low-resistance conductive layer 4, a first adhesive layer 5, a second flexible film 6, a second low-resistance conductive layer 7, a second adhesive layer 8, and a transparent cover plate 9 sequentially from bottom to top. The first low-resistance conductive layer 4 includes a first touch conductive layer 41 and a first wire 42 integrally formed. The second low-resistance conductive layer 7 includes a second touch conductive layer 71 and a second wire 72 integrally formed. The first touch conductive layer 41 and the second touch conductive layer 71 correspond to the display region 1. The first wire 42 and the second wire 72 correspond to the transmission region 2. A thickness of the first wire 42 is greater than that of the first touch conductive layer 41, and a thickness of the second wire 42 is greater than that of the second touch conductive layer 41.

As shown in FIG. 1, a conductive film structure of the present disclosure is defined from two dimensions: a horizontal direction and a vertical direction.

Viewed from the horizontal direction, the touch device of the present disclosure includes a display region 1 and a transmission region 2. The transmission region 2 is arranged on at least one side around the display region 1. The display region 1 refers to an interface of the touch device for display or human-computer interaction. The transmission region refers to a region for transmitting a display region signal is transmitted on the same horizontal dimension of the display region and is generally decorated with a shielding layer. In this embodiment, transmission region 2 is located around display region 1.

Figure 4:
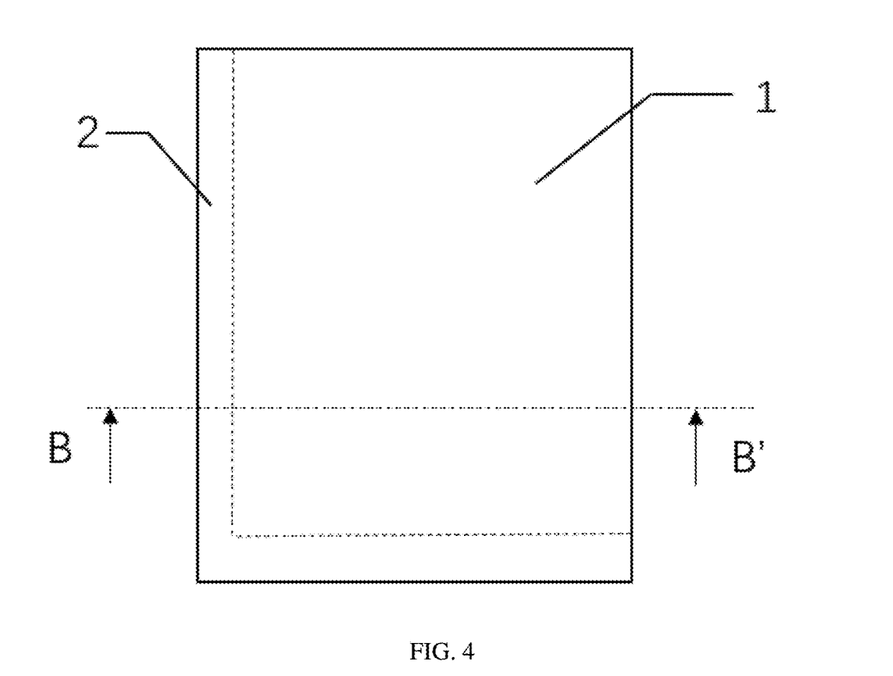
FIG. 4 is a top view of a touch device according to another embodiment of the present disclosure.
Figure 5:
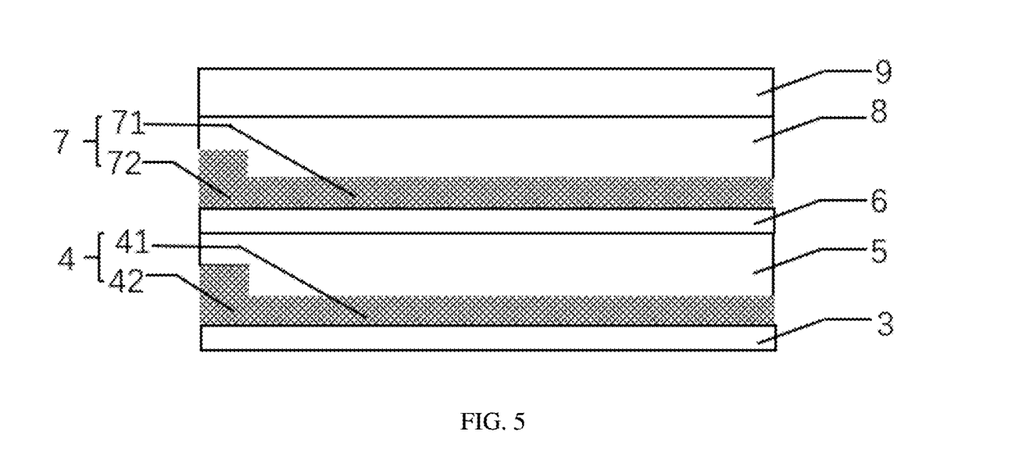
FIG. 5 is a schematic diagram of a profile in a B-B' direction in FIG. 4.

As shown in FIG. 4 and FIG. 5, in another embodiment, the transmission region 2 is located on any two adjacent sides around the display region 1. Since the wire of the transmission region and the touch conductive layer in the display region (including the first touch conductive layer and the second touch conductive layer hereinafter) are made of the same low-resistance material and the thickness of the wire (including the first wire and the second wire hereinafter) is greater than that of the touch conductive layer in the present disclosure, the impedance is small and enough to bear a current load of a transmitted signal, thus increasing an area of the display region. In addition, the first wire is used to replace Ag paste in the prior art, with the following advantages: one procedure can be eliminated, a magnetron sputtering coating is directly integrally formed (the wire and the touch conductive layer are coated at the same time), and the manufacturing process is simplified.

Viewed from the vertical direction, the touch device of the present disclosure includes a first flexible film 3, a first low-resistance conductive layer 4, a first adhesive layer 5, a second flexible film 6, a second low-resistance conductive layer 7, a second adhesive layer 8, and a transparent cover plate 9 sequentially from bottom to top, which may be understood as that each hierarchical structure of the touch device in the present disclosure has a corresponding display region and a corresponding transmission region in the vertical direction. The first low-resistance conductive layer 4 includes a first touch conductive layer 41 and a first wire 42 integrally formed. The second low-resistance conductive layer 7 includes a second touch conductive layer 71 and a second wire 72 integrally formed. The first touch conductive layer 41 and the second touch conductive layer 71 correspond to the display region 1. The first wire 42 and the second wire 72 correspond to the transmission region 2. A thickness of the first wire 42 is greater than that of the first touch conductive layer 41, and a thickness of the second wire 72 is greater than that of the second touch conductive layer 71. The display region and the transmission region corresponding to the first low-resistance conductive layer 4 and the second low-resistance conductive layer 7 of the present disclosure in the vertical direction are integrally formed in the manufacturing process. In the prior art, conductive materials such as ITO are generally used in the display region. However, due to the large impedance of ITO, conductive silver paste with low impedance is generally used in the transmission region. Two manufacturing processes are needed to coat an ITO film and a silver paste film respectively. The technical solution of the present disclosure can be used to transmit signals as it adopts a low-resistance conductive layer with low impedance. As a whole, only one manufacturing process is needed, and the cost is saved. The characteristics of the transmission region for transmitting the display region signal are not only affected by the resistance, but also affected by the reactance. Therefore, the thickness of the wire corresponding to the transmission region is greater than the thickness of the touch conductive layer corresponding to the display region, which further reduces the impedance of the transmission region, so that a better effect is achieved in a case that the display region and the transmission region use the same material and the same manufacturing process. Moreover, the touch conductive layer of the display region and the wire of the transmission region are integrally formed, which saves the complexity of different manufacturing processes, and saves the cost. At the same time, in the low-resistance conductive layer supported by the flexible film, the touch conductive layer in the display region may not be easily detached from the wire in the transmission region, which also eliminates the need to reinforce a lap region between the touch conductive layer and the wire.

In this embodiment, the first flexible film 3 and the second flexible film 6 are made of polyethylene terephthalate (PET). In other embodiments, the first flexible film 3 and the second flexible film 6 are made of one or more materials selected from a group consisting of polyimide (PI), polypropylene (PP), polystyrene (PS), cellulose triacetate (TAC), FMH acrylonitrile-butadiene-styrene (ABS), polyvinyl chloride (PVC), polycarbonate (PC), polyethylene (PE), polymethyl methacrylate (PMMA), polytetrafluoroethylene (PTFE), a cyclic olefin copolymer (COP, Arton), and polyethylene naphthalate (PEN). The first flexible film 3 and the second flexible film 6 are made of the same material or different materials.

In this embodiment, a resistance of the first low-resistance conductive layer 4 and a resistance of the second low-resistance conductive layer 7 are less than or equal to 30Ω/□. In the prior art, conductive materials such as ITO are generally used in the display region. However, due to the large impedance of ITO, conductive silver paste with low impedance is generally used in the transmission region. Two manufacturing processes are needed to coat an ITO film and a silver paste film respectively. The present disclosure can be used to transmit signals as the resistance of the conductive layer is less than or equal to 30Ω/□ and the impedance is low. As a whole, only one manufacturing process is needed, and the cost is saved. The characteristics of the transmission region for transmitting the display region signal are not only affected by the resistance, but also affected by the reactance. Therefore, the thickness of the first wire 42 is greater than the thickness of the first touch conductive layer 41, and the thickness of the second wire 72 is greater than the thickness of the second touch conductive layer 71, which further reduces the impedance of the transmission region, so that a better effect is achieved in a case that the first wire 42 and the first touch conductive layer 41 as well as the second wire 72 and the second touch conductive layer use the same material and the same manufacturing process. In another embodiment, a resistance of the first low-resistance conductive layer 4 and a resistance of the second low-resistance conductive layer 7 are 3-18Ω/□. In another embodiment, a resistance of the first low-resistance conductive layer 4 and a resistance of the second low-resistance conductive layer 7 are 3-10Ω/□. In this embodiment, the lower the resistance value of the low-resistance conductive layer, the higher the touch sensitivity of the touch device and the better the user experience. The touch device may be 98 inches.

In this embodiment, the thickness of the first wire 42 is greater than that of the first touch conductive layer 41, and a thickness difference thereof is 18-22 nm. In other embodiments, the thickness difference is 19-21 nm. In another embodiment, the thickness difference is 19.5-20.5 nm. The thickness of the first wire 42 is 95-145 nm, and in another embodiment, the thickness of the first wire 42 is 110-130 nm. The thickness of the first touch conductive layer is 80-120 nm.

In this embodiment, the thickness of the second wire 72 is greater than that of the second touch conductive layer 71, and a thickness difference thereof is 18-22 nm. In other embodiments, the thickness difference is 19-21 nm. In another embodiment, the thickness difference is 19.5-20.5 nm. The thickness of the second wire 72 is 95-145 nm, and in another embodiment, the thickness of the first wire 42 is 110-130 nm. The thickness of the second touch conductive layer is 80-120 nm.

The thickness of the touch conductive layer in the present disclosure should not be too thick; otherwise, the light transmittance and an overall thickness of the touch device may be affected. If the touch conductive layer is too thin, the resistance of the touch conductive layer increases, which affects the conductive effect. At the same time, the thickness of the wire also affects the resistance, but when the wire transmits a signal from the touch conductive layer, the transmission of the signal is affected not only by the resistance but also by the reactance. The reactance is inversely proportional to the capacitance. Therefore, the thickness of the wire is greater than that of the touch conductive layer, which can effectively reduce the impedance of the first wire 42 and the second wire 72.

In other implementations, the impedance Z of the first wire 42 and the second wire 72 is less than or equal to 5Ω. When the first wire 42 and the second wire 72 transmit a signal, the obstruction effect caused by a current in a circuit may affect the transmission of the signal, which may cause signal reflection and other problems. The wire has a good signal transmission effect when the impedance of the first wire 42 and the second wire 72 is less than or equal to 5Ω.

In this embodiment, a horizontal projection distance of the first wire 42 above a side face of the first touch conductive layer 41 is 0-5 nm. It may be understood that the first wire 42 and the first touch conductive layer 41 form an obvious step. In other embodiments, a horizontal projection distance of an interface between the first wire 42 and the first touch conductive layer 41 is 0, that is, the interface is perpendicular to the horizontal plane. When the step form is more obvious, the conduction capability of a circuit corresponding to the transmission region is more uniform.

In this embodiment, a horizontal projection distance of the second wire 72 above a side face P of the second touch conductive layer 71 is 0-5 nm. It may be understood that the second wire 72 and the second touch conductive layer 71 form an obvious step. If the step is not obvious, there is a sense of hierarchy, and the touch screen can be seen from a side, affecting the beauty. Preferably, a horizontal projection distance of an interface between the second wire 72 and the second touch conductive layer 71 is 0, that is, the interface is perpendicular to the horizontal plane.

Figure 6:
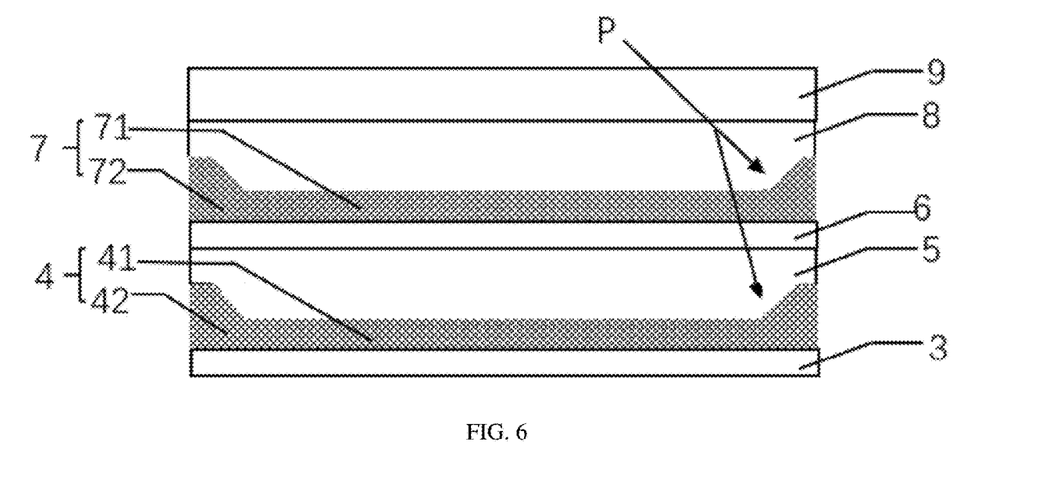
FIG. 6 is another schematic diagram of a profile in an A-A' direction in FIG. 2.

In other embodiments, as shown in FIG. 6, an angle between the side face P and the surface of the second touch conductive layer is an acute angle, which may be understood as that an angle formed by the side face P tilting near the display region is an acute angle, for example, the angle is less than 70 degrees, preferably less than 45 degrees. Since the second low-resistance conductive layer 7 is near the transparent cover plate 9, that is, near the human eye, if the side face P tilts near the display region, it is not easy for the human eye to recognize a line formed by the side face when interacting with the display region, thus reducing appearance defects. Moreover, the horizontal projection distance of the side face P is 0-5 nm, which does not affect the conductivity uniformity of the wire.

Preferably, a refractive index of the first adhesive layer 5 is 1.6-1.8, and a refractive index of the second adhesive layer 8 is 1.8-2.0. The first adhesive layer 5 uses an adhesive with a low refractive index, and a refractive index difference with the second adhesive layer is maintained between 0.1 and 0.3. The low-resistance conductive layer of the present disclosure with lower resistance has a lower reflectivity difference, and a reflectivity difference between the adhesive layers is smaller, which has a good adjustment and matching effect on chromatic aberration generated by the low-resistance conductive layer and other layers in the display device. In other implementations, the first adhesive layer and the second adhesive layer may be an optical clear adhesive (OCA), a liquid optical clear adhesive (LOCA), or a PVB sheet adhesive.

In this embodiment, the low-resistance conductive layer includes a weathering layer, an electrical conduction layer, and an anti-oxidation layer. The electrical conduction layer is made of metal and oxide/nitride of the metal. The transparent conductive material layer is made of indium tin oxide (ITO), indium zinc oxide (IZO), antimony tin oxide (ATO), and zinc aluminum oxide (AZO). In another embodiment, the electrical conduction layer is made of a composition of silver and silver oxide or, a composition of copper and copper nitride. The transparent material layer is made of ITO.

Figure 7:
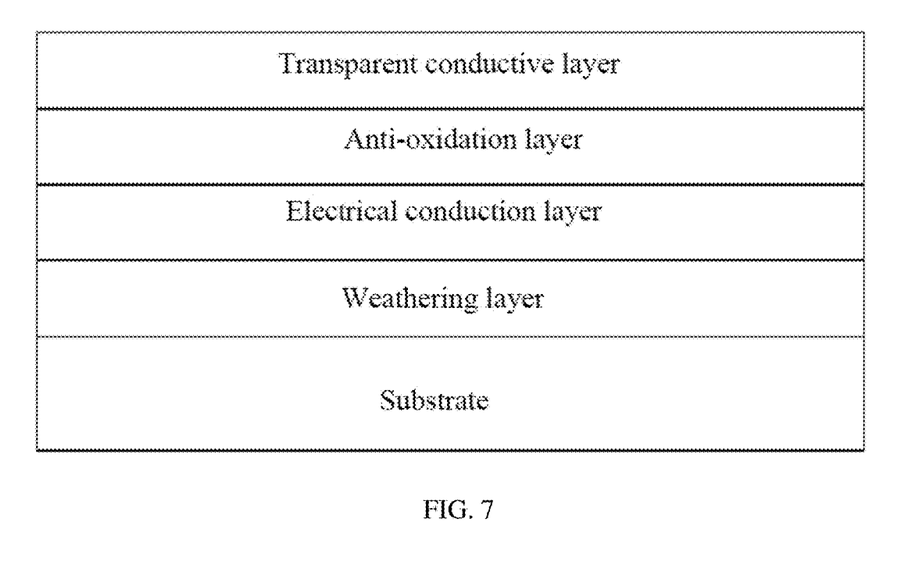
FIG. 7 is a schematic diagram of a first low-resistance conductive layer.

In other embodiments, as shown in FIG. 7, the first low-resistance conductive layer 4 includes a weathering layer, an electrical conduction layer, an anti-oxidation layer, and a transparent conductive material layer. During the touch, the human body touches the transparent cover plate 9, and a human electric field and the conductive layer form a coupling capacitor. However, a distance between the first low-resistance conductive layer 4 and the transparent cover plate 9 is greater than that between the second low-resistance conductive layer and the transparent cover plate 9. Therefore, the conductive layer and the transparent conductive material layer in the first low-resistance conductive layer 4 form a tunneling effect, which has an effect of electron migration penetration and increases the conductive effect.

In this embodiment, a thickness of the display region to which the electrical conduction layer belongs is less than or equal to 10 nm. When the electrical conduction layer is made of a composition of silver and silver oxide or a composition of a copper and copper nitride and the thickness of the electrical conduction layer is less than or equal to 10 nm, the electrical conduction layer can form a continuous layer to avoid forming an island structure, which can improve the conductivity without affecting the light transmittance of the conductive layer.

The transparent cover plate 9 of the present disclosure may be planar or non-planar. The material may be an inorganic material, for example, glass, quartz, or sapphire, but is not limited thereto, and may also be organic plastic. For example, the material may be polyethylene terephthalate (PET), polyethylene naphthalate (PEN), polycarbonate (PC), polyether sulfone (PES), and polyimide (PI), but is not limited thereto, and may also be composed of a combination of organic material and organic plastic. In another embodiment, the transparent cover plate 9 is preferably a sapphire of 2.5D or 3D. 2.5D herein means that the top and bottom are flat planes and two sides of an upper surface are arc-shaped. 2.5D allows the transmission region to be a visually narrow bezel. 3D means that the lower surface is flat and the upper surface is arc-shaped.

Although the present disclosure is described in detail above, the foregoing description is in all respects only an illustration of the present disclosure and is not intended to limit its scope. Therefore, various improvements or transformations may be made without departing from the scope of the present disclosure.

The invention claimed is:

1. A touch device, comprising a display region and a transmission region, the transmission region being arranged on at least one side around the display region, the touch device comprising:
   a first flexible film;
   a first low-resistance conductive layer directly connected to the first flexible film;
   a first adhesive layer directly connected to the first low-resistance conductive layer;
   a second flexible film directly connected to the first adhesive layer;
   a second low-resistance conductive layer directly connected to the second flexible film;
   a second adhesive layer directly connected to the second low-resistance conductive layer; and
   a transparent cover plate directly connected to the second adhesive layer;
   wherein the first low-resistance conductive layer comprises a first touch conductive layer and a first wire integrally formed through a first single step of sputtering;
   wherein the second low-resistance conductive layer comprises a second touch conductive layer and a second wire integrally formed through a second single step of sputtering, the first touch conductive layer and the second touch conductive layer are corresponding to the display region, the first wire and the second wire are corresponding to the transmission region;
   wherein a thickness of the first wire is greater than that of the first touch conductive layer, the first wire and the first touch conductive layer are characterized by a first thickness difference, the first thickness difference being in accordance with a predetermined light transmittance and a signal transmission of the touch device; and
   wherein a thickness of the second wire is greater than that of the second touch conductive layer, the second wire and the second touch conductive layer are characterized by a second thickness difference, the second thickness difference being in accordance with the predetermined light transmittance and the signal transmission of the touch device.

2. The touch device according to claim 1, wherein a resistance of the first low-resistance conductive layer and a resistance of the second low-resistance conductive layer are less than 30 Ω/□.

3. The touch device according to claim 1, wherein the second thickness difference between the second wire and the second touch conductive layer is 18-22 nm.

4. The touch device according to claim 1, wherein thicknesses of the first wire and the second wire are 95-145 nm.

5. The touch device according to claim 1, wherein impedance of the first wire and impedance of the second wire are less than or equal to 5Ω.

6. The touch device according to claim 1, wherein a horizontal projection distance of the first wire above a side face of the first touch conductive layer is 0-5 nm and/or a horizontal projection distance of the second wire above a side face of the second touch conductive layer is 0-5 nm.

7. The touch device according to claim 6, wherein an angle between the side face and the second touch conductive layer is an acute angle.

8. The touch device according to claim 1, wherein a refractive index of the first adhesive layer is 1.6-1.8, and a refractive index of the second adhesive layer is 1.8-2.0.

9. The touch device according to claim 1, wherein the first low-resistance conductive layer comprises a weathering layer, an electrical conduction layer, an anti-oxidation layer, and a transparent conductive material layer.

10. The touch device according to claim 9, wherein a thickness of the electrical conduction layer of the display region is less than or equal to 10 nm.

11. A touch device, comprising:
    a first flexible film;
    a first low-resistance conductive layer interfacing the first flexible film;
    a first adhesive layer interfacing the first low-resistance conductive layer;
    a second flexible film interfacing the first adhesive layer;
    a second low-resistance conductive layer interfacing the second flexible film;
    a second adhesive layer interfacing the second low-resistance conductive layer; and
    a transparent cover plate interfacing the second adhesive layer;
    wherein the first low-resistance conductive layer comprises a first touch conductive layer and a first wire coupled to the first touch conductive layer, the first touch conductive layer and the first wire together being obtainable by a first magnetron sputtering process;
    wherein the second low-resistance conductive layer comprises a second touch conductive layer and a second wire coupled to the second touch conductive layer, the second touch conductive layer and the second wire together being obtainable by a second magnetron sputtering process;
    wherein the first wire and the first touch conductive layer are characterized by a first thickness difference, the first thickness difference is associated with a first resistance of the first low-resistance conductive layer;
    wherein the second wire and the second touch conductive layer are characterized by a second thickness difference, the second thickness difference is associated with a second resistance of the second low-resistance conductive layer.

12. The touch device according to claim 11, wherein the first thickness between the first wire and the first touch conductive layer is configured such that an impedance of the first wire is lower than an impedance of the first touch conductive layer.

13. The touch device according to claim 11, wherein the second thickness between the second wire and the second touch conductive layer is configured such that an impedance of the second wire is lower than an impedance of the second touch conductive layer.

\* \* \* \* \*